INVENTORS
JAMES A. MURPHY
STIRLING ROBERT BROWN

United States Patent Office 3,672,950
Patented June 27, 1972

3,672,950
ADHESIVELY LAMINATED CELLULOSIC PRODUCT
James A. Murphy and Stirling Robert Brown, Oxnard, Calif., assignors to International Paper Company, New York, N.Y.
Filed Jan. 12, 1970, Ser. No. 2,135
Int. Cl. B32b 3/28
U.S. Cl. 161—129                                                8 Claims

ABSTRACT OF THE DISCLOSURE

A laminated tissue product is formed from webs bonded in superposed relation employing patterned lines of bonding delineating substantial unbonded regions. The webs are maintained out of intimate contact over substantial portions of these unbonded regions to provide a quilted or cushioned effect. This may be achieved by embossing a number of protuberances on at least one web to face the other and keep the webs apart. Alternatively, or in addition, the webs may be joined under different respective tensions so that, upon relaxing, one web is of greater area than the other.

---

This invention relates generally to laminated fabric products and particularly to laminated creped cellulosic products. More specifically, this invention relates to laminated creped tissue products which find particular use as facial or bathroom tissue.

Creped cellulosic tissue or wadding has long been employed in the manufacture of facial and bathroom or toilet tissue. Creped tissue is a soft and absorptive product, but its strength is low. In an attempt to increase the strength of the tissue, multi-ply tissue structures have been employed, and in many instances wet strength-imparting resins have been added to the tissue web.

Multiple-ply tissue structures tend to delaminate or come apart and consequently lose the strength advantage represented by the multiple plies. Strength-imparting additives are not satisfactory for general use, since they reduce the softness of the product and impair its draping quality.

While the problems inherent in the use of creped tissue have been relatively small in the case of tissue for facial use, the conflicting requirements of strength and softness have not been satisfactorily solved in connection with tissue for toilet use. Toilet uses require a high degree of absorptivity and softness of the tissue; hence the prior art techniques for strengthening the tissue, as by adding wet-strength resins, have created a tissue which is undesirable for toilet use.

It is therefore an object of the present invention to provide strong, soft, laminated fabric products of suitable bulk. It is a further object to provide a creped cellulosic product which can be employed in the manufacture of toilet tissue having improved strength, softness, drape and absorptivity. It is also an object to provide a creped cellulosic product which is particularly useful in the manufacture of strong facial tissue having improved softness, drape and absorptivity. It is also an object to provide a method for the economical manufacture of improved laminated fabric products utilizing a minimum of raw material.

Other objects and advantages of the invention will become known by reference to the following description and the accompanying drawings. In the drawings.

Figure 1:
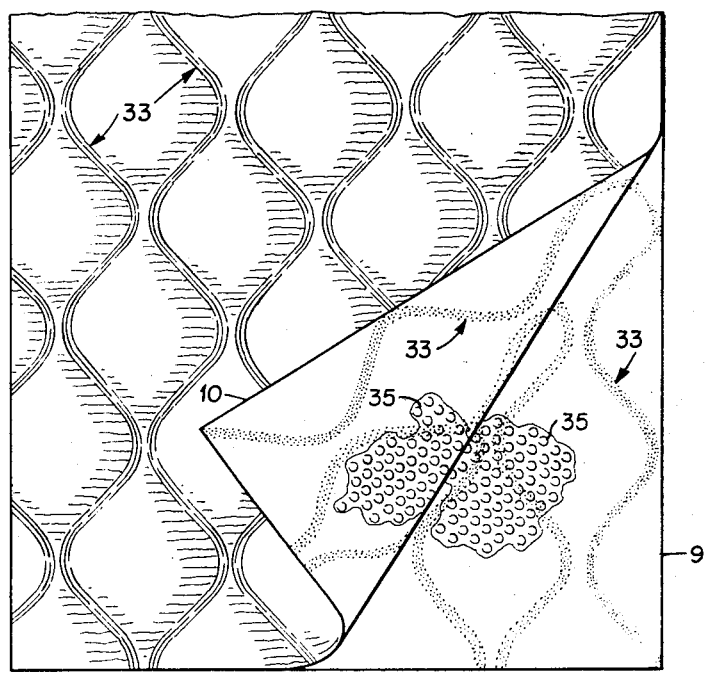
FIG. 1 is a view of a creped cellulosic product embodying various of the features of the invention (only portions of the embossing of each web are shown)

Stated broadly, the present invention comprehends a laminated nonwoven fabric including at least two flat nonwoven webs bonded in superposed relation by a system or network of bonding defining substantial unbonded regions. In the product the webs are out of intimate contact in such unbonded regions. This latter structure may be achieved by embossing a number of protuberances on at least one of the webs to face the other and keep the webs apart. Alternatively, or in addition, the webs may be joined under different respective tensions so that, upon relaxing, one web contracts a greater amount than the other and the webs separate in the unbonded regions.

In general, the creped cellulosic product of the invention comprises at least two single ply webs, each having a dryer basis weight of between about 5 and 9 pounds per ream (2880 square feet) and a crepe ratio of from about 1.2 to 1.5 (uncreped length divided by creped length), bonded in superposed relation by an adhesive disposed between the webs to form a laminated creped structure. It has been found that to obtain the best results the adhesive is preferably applied in a pattern of lines which define limited bonded regions delineating substantial unbonded regions in order to enhance the desirable physical characteristics of the product, namely, drape, softness, strength and absorptivity.

It has also been discovered that the desirable properties of the web may be further enhanced by conditioning the webs to reduce physical contact between the webs in the unbonded areas. This result may be accomplished on the one hand by separately embossing the individual webs with appropriate protuberances and arranging the webs in the laminate with their protuberances facing. In the unbonded regions, the protuberances of each web contact the other web to maintain the webs out of intimate contact with each other except where such protuberances contact the other web. It has been discovered also that a like result may be obtained by elastically stretching one web transversely of its lines of creping to a greater extent than the other during the manufacturing process and relaxing the webs after they have been bonded into a laminated structure. Upon relaxation of the webs, the different extents of web elongation cause one web to contract a greater amount than the other web, leaving the webs in different conditions of stress and forcing that web which was stretched least to go slack and fall out of intimate contact with the other web within the unbonded regions. This latter effect may be enhanced by disposing the adhesive lines, which are used to interconnect the webs, in directions extending obliquely to the machine direction of the webs. Differential stretching and embossing have been employed simultaneously, and the product has been found to exhibit even greater beneficial features. The result is a quilted or cushioned effect adding bulk to the product and forming a particularly soft product.

Smoothness of the exterior surfaces of the laminated product may be promoted by disposing the web plies with their dryer sides outward (the "dryer" side being that side of the creped web which contacted the dryer from which the web was doctored during a final step of its manufacture). Additionally, a surface which is relatively smooth to the touch has been found to result when any embossments present on the tissue webs are directed inwardly so that the exterior sides of the respective webs are free of rough projections and define substantially planar surfaces.

The plies of the present laminated product may be securely retained against delamination by spaced lines of adhesive, thereby assuring realization of the strength advantage attending an interlocked multiple-ply structure even under severe use conditions. For example, when the present product is used as bathroom tissue, the tissue webs neither delaminate nor tear improperly when torn away from a roll of perforated sheets, as is so commonly true of prior art bathroom tissue. Additionally, web conditioning as employed in a preferred method for manufacturing the present product and the resultant separation of the webs in unbonded regions has been found to develop individual areas of strength distributed relatively uniformly throughout the entire area of the product. Within each unbonded region, the conditioned webs compress toward each other when subjected to shear or impact forces. Such compression is resisted by the facing embossments and/or the slack web. Within each unbonded region this resistance acts as a cushion to absorb energy which would otherwise rupture the individual webs.

Further, the lines of bonding between the two webs constitute corridors of strength, the adhesive acting to bond the web fibers into a strong mass within the regions of bonding. Preferably, the lines of adhesive extend obliquely of the machine direction of the webs so as to establish intersecting or near-intersecting corridors of strength which roughly define diamond-shaped or circular patterns. These patterns have been found to impart good bidirectional strength to the laminated product, such corridors being especially effective in maintaining product strength when the product is bent, twisted, flexed or similarly manipulated during its use, for the webs would otherwise skew with respect to each other so as to reduce their cooperative contribution to the overall strength of the product. That is, the oriented corridors of strength aid in maintaining the separated unbonded webs in their superposed strength-contributing attitude. The adhesive lines also have been found to provide a gentle hardening in limited areas which enhances the wiping capability of the laminated product without materially impairing its overall softness.

The individual creped webs of the present laminated product preferably comprise creped tissue prepared from sulphite pulp, each web being about .0025 inch thick, having a basis weight between about 5 and 9 lbs. (per ream of 2880 square feet), and a crepe ratio between about 1.2 and 1.5.

The two creped tissue webs are bonded in superposed relation to produce a laminated product. Bonding is affected by disposing an adhesive between the webs in accordance with a preselected pattern of application. The adhesive is preferably one of the thermoplastic resins. Polyvinyl alcohol in an aqueous medium has been found particularly desirable because of its fast rate of setting up, its compatibility with the tissue, and its inertness in the set-up state. A particular adhesive found suitable is 6% polyvinyl alcohol as prepared by mixing together 5 parts of polyvinyl alcohol sold under the trademark of Covol 9870 (distributed commercially by Corn Products Company, New York, N.Y.) with 80 parts of water, 1 part of a wetting agent sold under the trademark of Triton X-100 (distributed commercially by Rohm & Haas Company, Philadelphia, Pa.), and 0.1 part of an antifoaming agent sold under the trade name of Antifoam B (distributed commercially by Rohm & Haas Company, Philadelphia, Pa.). The wetting agent is optional in the mixture. Its presence in the adhesive renders the adhesive bonds permeable to liquids so that the bonds do not act as dams and restrict the absorptivity of the product. The antifoaming agent reduces the foam build-up in the adhesive thereby decreasing the tendency of the adhesive to change in viscosity because of air entrapped in the mixture and avoiding the problem of containment of the foam during the application of the adhesive.

Figure 4:
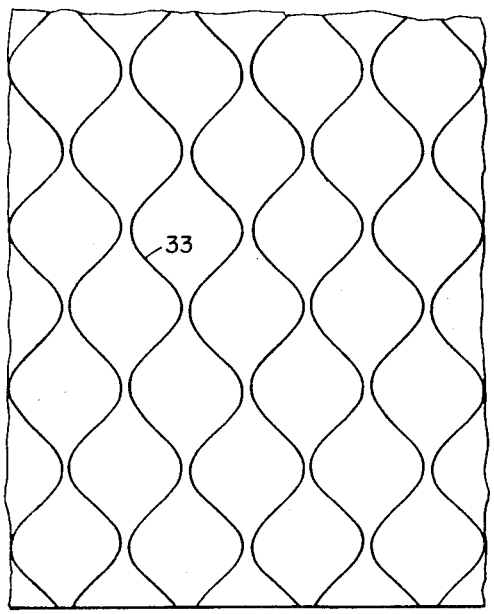
FIGS. 3 and 4 are illustrative of patterns of adhesive which can be employed in the product shown in FIG. 1.
Figure 3:
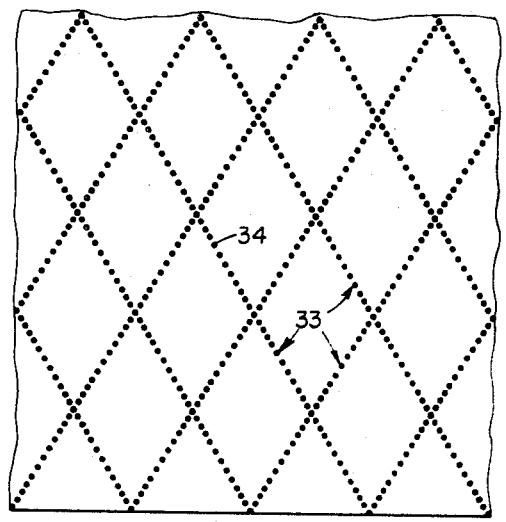

The adhesive is disposed between the webs in accordance with a pattern of lines 33 (FIGS. 1, 3, 4). These lines may be continuous or discontinuous or a combination of these. FIG. 4 depicts one such pattern. The lines also may include or comprise a series of spots 34 as illustrated in FIG. 3. This further reduces the damming effects of the adhesive tending to isolate regions from fluid communication with other regions. That is, not only is the adhesive itself made water permeable, but the adhesive is disposed in dicrete separated spots. The spaced spots also produce a more flexible product than continuous lines of adhesive. In any event, the lines of adhesive are in a pattern wherein the lines form limited regions of bonding outlining substantial unbonded regions. The size of the respective unbonded areas between bond lines is great enough to permit the hereinbefore described separation of the webs within the unbonded region, thereby producing the desired quilted effect; yet it is not so great as to leave the webs substantially unbonded. Unbonded regions encompassing an area on the order of about 1 square inch have been found satisfactory and are preferred.

The amount of adhesive applied should be sufficient to produce the desired adhesion of the individual webs without adding substantial stiffness to the resulting product. By concentrating the adhesive described above in lines of adhesive about 0.0625 inch wide with the above spacing, and applying about 0.002 to 0.003 ounce of adhesive per square foot of product, the webs adhere sufficiently that the fibers are pulled from the webs before the adhesive bonds break.

The desired separation of the webs within each unbonded region may be achieved either by embossing or by differentially stretching the webs and is preferably achieved by the combination of the two methods. In accordance with the embossing concept, at least one web and preferably both are embossed with a great number of pin-like embossments or protuberances 35 (FIG. 1). These embossments extend normally from the body of the web for a predetermined distance as required to keep the two webs suitably spaced, the two webs being superposed with the protuberances of each web facing the other web. On that side of the web opposite each protuberance, there occurs a corresponding depression (not shown in the drawings). The diameter of each depression is so small as to leave a relatively smooth surface on one side of the embossed web. A diameter of about 0.0156 inch has proven satisfactory. Further the embossments are spaced far apart, for example 0.0625 inch center to center, relative to the diameter of the depressions, leaving the outside of the resulting laminate essentially planar. On the other hand, the protuberances are disposed close enough to assure that the webs are separated over the entire unbonded area by substantially the height of the protuberances. For clarity, the embossing depicted in FIG. 1 is shown larger in size than the above cited dimensions.

The shape and distribution of the embossments are significant, but a number of different shapes and distributions are satisfactory. Conical embossments may be used wherein the embossments on one web fall between embossments on the other and superposed web. However, the webs may be separately embossed with patterns such that when webs are superposed, the embossments of one web will abut the embossments of the other web. In this latter situation, the webs will be maintained separated by a distance approximately equal to the combined heights of the abutting embossments. In either event the protuberances of one web do not nest in the "depressions" of the other web—a situation which not only destroys the web separation but also produces a harsh, stiff product.

The shape an distribution of the embossments are preferably such that the embossments are relatively permanent. For example, a relatively deep embossment, even to the point of rupture of fiber bonds, is not easily flattened or pulled out, as by stretching of the webs or by winding the laminate in rolls.

Separation of the plied webs within the unbonded regions may be attained by differentially stretching the two webs elastically prior to bonding them into the laminate, and relaxing the webs after bonding. Control of the tensions in the respective webs as they pass through the manufacturing apparatus provides a stretch in one web greater than that in the other web. While in this state, the webs are superposed with their lines of creping parallel and with the adhesive disposed between them. After the adhesive has set up, the webs are relaxed from their stretched attitudes. Both webs then contract with the web which was stretched to the greater extent prior to bonding exhibiting a greater degree of contraction. This differential contraction causes buckling of the other web and resultant separation of the webs. The buckling and concomitant separation occur within each unbonded region. Repetition of the effect over the entire laminated product gives the product a very pleasing feel and a quilted appearance as well as providing the strength advantage discussed hereinbefore.

The differential stretching of the webs not only adds bulk to the resulting laminate, but it provides a convenient way of controlling bulk. This differential stretching makes it possible to produce a wide range of thickness for the laminate from a particular pair of individual webs. For bathroom tissue, the laminate preferably will be between about .0035 and 0.006 inch thick irrespective of the basis weight of the individual webs, which is preferably relatively low for economical manufacture. This produces a roll about 5.0 inches in diameter with 325 sheets 6" long wound on a core about 1.5 inches in diameter.

Figure 2:
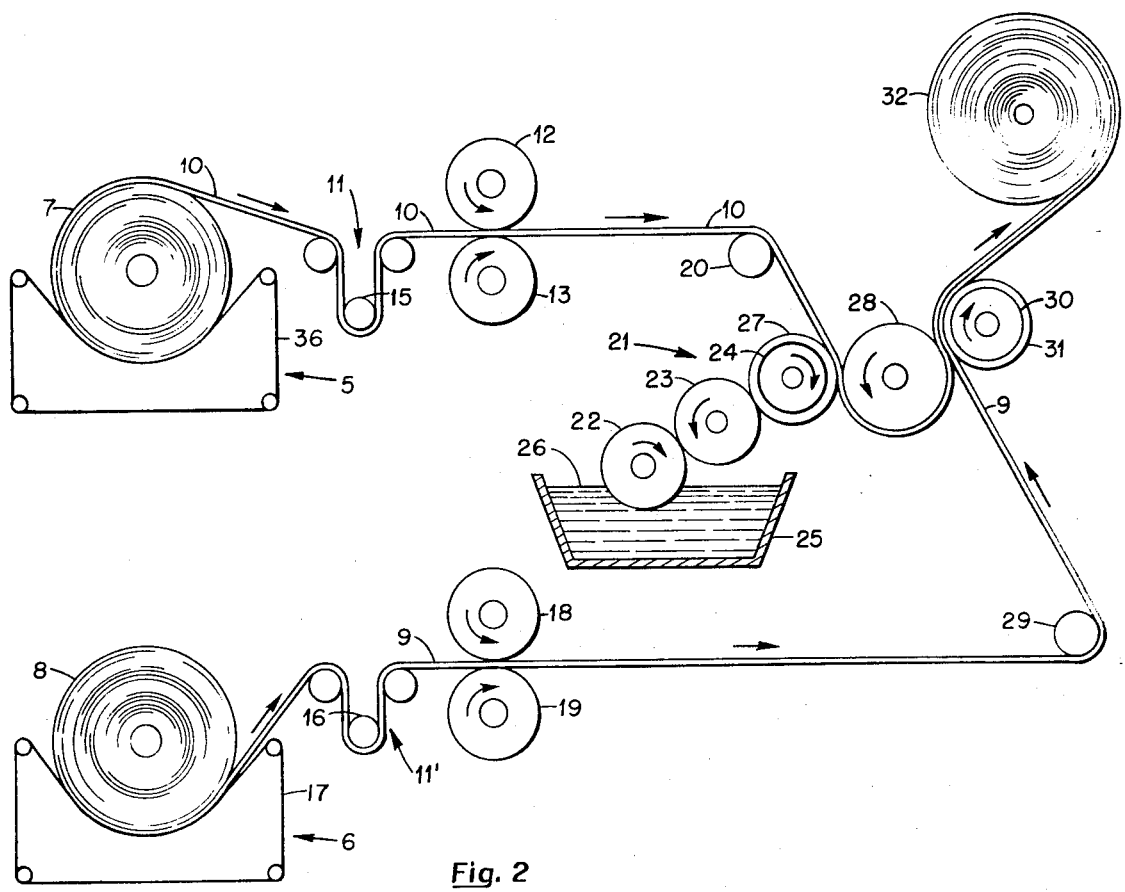
FIG. 2 is a representation of apparatus for manufacturing the product shown in FIG. 1.

Referring now to FIG. 2, apparatus for the manufacture of the present laminated bathroom tissue product includes a pair of unwind stands 5 and 6 designed to dispense continuous webs of crepe tissue uniformly from respective rolls 7 and 8. Preferably, within the unwind stands the rolls of tissue are supported on continuous belts 36, 17 whose movements turn rolls 7 and 8 at respective uniforms speeds, thereby paying out continuous creped tissue webs 10 and 9, respectively, at respective uniform speeds.

Tissue webs 10 and 9 are dispensed from the rolls 7 and 8, respectively, and pass over separate sets of rolls 11, 11' to respective sets of embossing rolls 12, 13 and 18, 19. The respective roll sets 11, 11' may each include a tension roll 15, 16 to maintain a constant respective tension in webs 10 and 9.

Each set of embossing rolls comprises a steel embossing roll 12, 19 and a mating steel roll 13, 18. Each of rolls 12 and 19 has its cylindrical surface engraved with a pattern of projections, and each of rolls 13, 18 is provided with a respective mating pattern of depressions to receive such projections so that when a tissue web is passed through the nip between an embossing roll and its respective mating roll, the web is embossed with the pattern on the embossing roll.

The first web 10, upon exiting from between rolls 12 and 13 passes over an idler roll 20 to an adhesive laminating apparatus 21 which includes a fountain roll 22, a transfer roll 23 and a pattern or plate roll 24. The fountain roll 22 is partially immersed in a tank 25 of liquid adhesive 26. It rotates in the adhesive 26 and carries adhesive to the nip between rolls 22 and 23 where the adhesive is transferred in a metered amount to the transfer roll 23. The amount of adhesive transferred to the roll 23 is controlled by the pressure between the rolls 22 and 23. The pattern roll 24 is preferably constructed of steel and has a rubber impression mat 27 provided on its surface. The mat 27 has portions of its surface raised in accordance with a predetermined pattern. The impression mat 27 contacts the surface of the transfer roll 23, thereby effecting transfer of a controlled quantity of adhesive to the raised portions of the mat 27 at such points of contact. The first web 10 is passed through the nip between the pattern roll 24 and a smooth steel impression roll 28. Adhesive is thereby laid down on the web 10 in accordance with the pattern of raised portions of pattern roll 24 in the form of an open pattern of lines defining limited bonding regions separated by relatively large adhesive-free regions.

The adhesive-bearing tissue sheet 10 is trained around the impression roll 28 in a direction transverse of the parallel lines of creping of the web 10. Simultaneously, the second web 9, exiting from embossing rolls 18 and 19, is passed in a direction transverse of the parallel lines of creping of the web 9 around a guide roll 29 and overlaid on the web 10 with the patterned adhesive between the webs and with the lines of creping of the second web 9 parallel to the lines of creping of the first web 10. As the two webs contact one another, a portion of the adhesive is transferred to web 9. The two webs 9 and 10 with the patterned adhesive therebetween are passed through the nip or plate roll 30 having a patterned impression mat 31 corresponding to mat 27 of the pattern roll 24 and driven in registry with pattern roll 24. As the webs 9 and 10 pass through the nip between the impression roll 28 and the second pattern roll 30, pressure is applied substantially only to the adhesive-bearing regions, forcing the adhesive, which has partially set up at this point, into bonding relation in the webs 9 and 10. The laminate may then be wound on a conventional winder 32 or passed to other process stations as desired such as a printing unit for printing a design on the product.

In order that the webs of the resulting laminate may be in different conditions of stress, during the laminating process the webs 9, 10 are subjected to a respective different tension transverse of the respective lines of creping in the plane of the respective web. The tension applied to each sheet during its passage through the apparatus determines the extent to which the web is stretched at the time the webs are bonded. The magnitude of this stretch is established by selective adjustment of the relative speeds of the unwind stands 5, 6, the sets of embossing rolls 12, 13 and 18, 19, and the rolls of the adhesive laminating apparatus 21. These individual rates of web travel are chosen so as to present the webs at their respective embossing stations under controlled conditions of tension and forward travel. The desired conditions of the webs may be achieved by unwinding each web and feeding it forwardly at a rate faster than the rate of passage of each such web through the nip of its respective set of embossing rolls. For example, it has been found that by unwinding one web at a rate which is about 1.8% faster than the rate of travel of such web through its embossing rolls, and unwinding the other web and feeding it forwardly at a rate of travel about 4.5% faster than it is passed through its respective embossing rolls, while simultaneously driving the embossing rolls for the latter web about 2% slower than the embossing rolls for the former web, both webs are presented to their respective sets of embossing rolls under respective appropriate conditions of slackness. As has been found in the present invention, by this means at each embossing station there is provided sufficient web material to serve the two-fold objective of thorough embossing and subsequent controlled elastic stretching of the webs to different degrees of elongation.

The present method further provides a means for controllably stretching the embossed webs to the desired different degrees of elongation as the webs are fed continuously forward to the laminating station. Specifically, it has been discovered that by driving one set of embossing rolls at a slower rate of rotation than that of the other set of embossing rolls, the web passing between the slower rolls becomes stretched more than the web passing between the faster rolls as the two webs are fed simultaneously to the nip of a pair of rolls in the laminating station, as will appear more fully hereinafter.

EXAMPLE I

Following the procedures set forth above, two separate webs of creped tissue paper, each .0025 inch thick and having a crepe ratio of 1.32, a basis weight of 5 lbs. (per ream of 2880 square feet) and negligible wet strength, were fed through separate sets of embossing rolls. Each set of rolls embossed a respective one of the tissue webs with a pattern of the kind depicted in FIG. 1. (Note: Each web was embossed over its entire surface area. Only portions of the embossing of the webs is shown in FIG. 1.) Each raised portion on each embossing roll was of conical geometry, extended to a height of .030 inch from the surface of the rolls, and possessed side walls inclined at a 30 degree angle with respect to the principal axis of the projection. The embossed protuberances on each web were spaced from each other about 0.0625 inch center to center. The two sets of embossing rolls were oppositely disposed such that the embossed protuberances of the two webs faced each other as they exited the embossing rolls. That is, embossing rolls 12 and 19, having protuberances thereon, were urged against the sides of the respective webs 10 and 9 that were on the outside of the laminate. This side of each web was the dryer side.

One of the embossed webs was directed through the nip between the impression roll 28 and the pattern roll 24 having its surface covered by a rubber impression mat 27 patterned as depicted in FIG. 4. The raised pattern of this mat extended to a height of .045 inch from the mat surface. Each pattern line was uniformly .0625 inch wide. In this example, 0.002 ounce of adhesive was transferred to each square foot of the first web 10 as it was passed between the pattern roll 24 and the impression roll 28. Polyvinyl alcohol adhesive in the formula as applied to the fountain roll 22 was 520 centipoises.

Following application of the adhesive to the first web 10, the second web 9 was overlaid on the web 10 with the respective protuberances facing the other web and with the patterned adhesive between the webs. The webs 9 and 10 with the adhesive therebetween were passed through the nip between the impression roll 28 and the matching pattern roll 30, where sufficient pressure was applied to force the partially set-up adhesive into bonding relation in the two webs 9 and 10, hence joining the webs into a two-ply laminate. The laminated product was of a thickness such that 325 sheets each 6.0 inches long on a core 1.5 inches in diameter formed a roll 4⅜ inches in diameter. The product was cut to width and divided into sheets by perforations and collected in rolls.

The bathroom tissue so produced was tested for strength using a Hounsfield tensometer, 62½ lbs. beam, in accordance with TAPPI Standard T404ts–66, except the jaw was set at 3" and the sample was 2" wide (values given in lbs. 1" wide). Its strength was found to be 1.2 lbs. measured parallel to its machine direction and 0.91 lb. in its cross direction.

Critical length of the bathroom tissue product was determined in accordance with ASTM No. D 1388–64, using a cantilever bending tester and found to be 8.4 cm. in the machine direction and 6.0 in the cross direction.

The rate of absorbency of the product, as tested in accordance with TAPPI Standard T432ts–64 (⅒ ml.), was found to be 2.7 seconds. Its rate of absorbency was 1.2 seconds when tested using Canadian Government Specification Board 9–Gt–4a, Sec. 6.3.1 (except sample was 6" x 6").

EXAMPLE II

A product was made just as in Example I except that different tensions were maintained in the respective webs at the times they were joined together.

In this example, the two creped tissue webs 9, 10 were fed continuously forward to and through respective embossing stations and thence to a laminating station as set forth hereinbefore. The web 10 was unwound and fed to embossing rolls 12, 13 at 1000 feet per minute (f.p.m.), while the web 9 was fed to embossing rolls 18, 19 at 1008 f.p.m. Embossing rolls 12, 13 were rotated at a speed such that web 10 was passed therethrough at 982 f.p.m. (1.8% slower than the web feed rate). Embossing rolls 18, 19 were rotated slower to pass web 9 therethrough at the rate of 963 f.p.m. (4.5% slower than the web feed rate). Rolls 18, 19 were operated about 2% slower than rolls 12, 13. Web 10 was maintained taut under a tension of about 2.18 lbs. per linear inch (p.l.i.) by roll 15. Web 9, under a tension of about 1.03 p.l.i., was maintained taut by roll 16.

The embossed webs were bonded into a laminate as they passed between impression roll 28 and plate roll 30 at 999 f.p.m. This rate, being 3.7% faster than the web travel at embossing rolls 18, 19 and 1.7% faster than the web travel at embossing rolls 12, 13 resulted in web 9 being stretched about 2% more than web 10.

After lamination the relaxed webs contracted different amounts and produced a laminated product which had greater quilted and cushioned quality than the product of Example I. When cut to width, perforated and collected on rolls, 325 sheets each 6 inches long on a core 1½ inches in diameter formed a roll 5 inches in diameter. Its strength was 1.1 lbs. in the machine direction and 0.84 lb. in the cross direction, its critical length was 6.1 cm. in the cross direction and 7.97 cm. in the machine direction, and its absorbency rate was 1.3 seconds (TAPPI T432ts–64) and 1.0 second (9–Gt–4a, Sec. 6.3.1).

The lines of adhesive bonding the webs together defined separated unbonded regions, thus the laminate had many separated areas of weakness that permitted bending twisting, flexing, etc. of the product. The tissue product therefore exhibited drape characteristics substantially like those of cloth and other woven fabrics. In use, the product conformed readily to the hand of the user and to the contour of the wiped surface. Its smooth surfaces and softness made the product ideally suited for the usual delicate uses of facial or bathroom tissue.

Various modifications may be made within the scope of the invention. For example, the webs 9 and 10 may be passed through the adhesive laminating apparatus 21 in other paths. The web 10 may be passed through the nip between the transfer roll 23 and the pattern roll 24, and the web 9 may be overlaid at the nip between the pattern roll 24 and the impression roll 28. Other patterns of embossing and adhesive may be used. Various features believed to be novel are included in the following claims.

What is claimed is:

1. A laminated creped tissue product consisting of at least a pair of creped tissue webs of papermaking fibers each having parallel lines of creping, said webs being superposed with the lines of creping of each of said webs substantially parallel to the lines of creping of the other of said webs, and adhesive disposed between said webs in a pattern bonding said webs together in limited regions disposed about substantial unbonded regions each of said webs being in a different condition of stress than the other in each of said unbonded regions in the direction substantially normal of the lines of creping in the plane of the respective web.

2. A product in accordance with claim 1 wherein each of said webs has a surface which was disposed adjacent a dryer during manufacture of said web and wherein that surface of each web which was disposed adjacent such dryer faces outwardly of the product.

3. A product in accordance with claim 1 wherein at a least major portion of the adhesive pattern consists of lines extending obliquely to the machine direction of the creped tissue sheets.

4. A product in accordance with claim 1 wherein each one of said webs includes a plurality of protuberances extending from its surface toward the facing surface of the other of said webs, said protuberances being discrete and spaced from each other by distances large relative to the size of the protuberances, substantially all of said protuberances on one web being out of register and out of contact with the facing protuberances on the other web.

5. A product in accordance with claim 4 wherein said protuberances comprise pin embossments.

6. A laminated tissue product consisting of at least two creped tissue webs of papermaking fibers in superposed relation, each of said webs having a surface which was disposed adjacent a dryer during manufacture of said web, and adhesive disposed in patterned lines between said webs and bonding said webs together in limited regions disposed about substantial unbonded regions, each of said webs including a plurality of discrete protuberances extending from the surface of the respective web toward the facing surface of the other web, said protuberances on each web being spaced from each other by distances large relative to the size of the protuberances, each of said unbonded regions including a large number of said protuberances, substantially all of the protuberances on one web being out of register and out of contact with the protuberances on the other web, the area of one of said webs being greater than that of the other in each of said unbonded regions, and that surface of each of the webs which was disposed adjacent a dryer during manufacture being on the outside of the product.

7. An adhesively laminated creped tissue product consisting of at least a pair of creped tissue webs of papermaking fibers each having a basis weight of about 5 to 9 pounds per ream of 2880 square feet and creped with a crepe ratio of about 1.2 to 1.5 with parallel lines of creping, said webs being superposed with the lines of creping of each web substantially parallel to the lines of creping of the other web, and adhesive disposed between said webs in a pattern bonding said webs together in limited regions disposed about substantial unbonded regions, each web being in a different condition of stress than the other in the direction substantially normal of the lines of creping in the plane of the respective web, the thickness of the laminate being such that 325 sheets each 6 inches long wound on a core of 1½ inches diameter produce a roll about 5 inches in diameter.

8. A product in accordance with claim 7 wherein each of said webs includes a plurality of pin embossments extending from its surface toward the facing surface of the other of said webs and substantially all of said pin embossments on one web are out of register and out of contact with the pin embossments on the other web.

References Cited
UNITED STATES PATENTS

| | | | |
|---|---|---|---|
| 3,214,323 | 10/1965 | Russell et al. | 156—291 |
| 3,316,136 | 4/1967 | Pufahl | 161—76 |
| 3,025,199 | 3/1962 | Harwood | 161—85 |
| 3,377,224 | 4/1968 | Gresham et al. | 161—129 |
| 3,327,708 | 6/1967 | Sokolowski | 156—290 |
| 2,030,746 | 2/1936 | Galligan et al. | 161—76 |
| 3,047,445 | 7/1962 | Gresham | 161—129 |
| 3,485,699 | 12/1969 | Bassett et al. | 161—148 |

ROBERT F. BURNETT, Primary Examiner

L. KOECKERT, Assistant Examiner

U.S. Cl. X.R.

156—164, 199, 209, 291; 161—146, 148

UNITED STATES PATENT OFFICE
CERTIFICATE OF CORRECTION

Patent No. 3,672,950  Dated June 27, 1972

Inventor(s) James A. Murphy and Stirling Robert Brown

It is certified that error appears in the above-identified patent and that said Letters Patent are hereby corrected as shown below:

Column 5, line 26, following "sheets", insert --each--;

Column 6, line 12, delete "or plate" and insert --between the impression roll 28 and a pattern-- therefor;

Column 7, line 26, following "formula", insert --referred to hereinbefore was used. The viscosity of the adhesive--;

Column 8, line 6, change "plate" to --pattern--.

Signed and sealed this 6th day of February 1973.

(SEAL)
Attest:

EDWARD M. FLETCHER, JR.
Attesting Officer

ROBERT GOTTSCHALK
Commissioner of Patents